(12) United States Patent
Renke et al.

(10) Patent No.: US 8,146,979 B2
(45) Date of Patent: Apr. 3, 2012

(54) SEAL MOLDINGS FOR VEHICLES

(75) Inventors: David T. Renke, Macomb, MI (US); Thomas D. Hagen, Grand Blanc, MI (US); Gulam Mohiuddin, Troy, MI (US); Gary L. Walters, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 371 days.

(21) Appl. No.: 12/574,759

(22) Filed: Oct. 7, 2009

(65) Prior Publication Data

US 2011/0080018 A1    Apr. 7, 2011

(51) Int. Cl.
*B60J 1/02* (2006.01)
(52) U.S. Cl. ............... 296/93; 296/84.1; 296/201
(58) Field of Classification Search .......... 296/84.1, 296/93, 201
See application file for complete search history.

(56) References Cited

U.S. PATENT DOCUMENTS

| | | | |
|---|---|---|---|
| 4,648,222 A * | 3/1987 | Miyata et al. | 296/93 |
| 4,879,853 A * | 11/1989 | Braendle et al. | 296/201 |
| 5,088,787 A | 2/1992 | Gross | |
| 5,396,746 A | 3/1995 | Whitmer | |
| 5,603,546 A * | 2/1997 | Desir, Sr. | 296/93 |
| 5,711,119 A * | 1/1998 | Cornils et al. | 296/201 |
| 5,906,697 A * | 5/1999 | Hasegawa et al. | 296/93 |
| 6,086,695 A | 7/2000 | Kreye | |
| 6,328,368 B1 | 12/2001 | Liu et al. | |
| 6,382,696 B1 | 5/2002 | Young | |
| 6,715,818 B2 * | 4/2004 | Raisch et al. | 296/93 |
| 6,810,635 B2 | 11/2004 | Meizlish | |
| 6,979,041 B2 | 12/2005 | May et al. | |

* cited by examiner

*Primary Examiner* — Lori Lyjak
(74) *Attorney, Agent, or Firm* — Quinn Law Group, PLLC

(57) ABSTRACT

A seal molding configured for minimizing a first perceivable gap having a first width between a vitreous element and a body panel of a vehicle includes a first portion configured for abutting the vitreous element and a second portion configured for abutting the body panel and including an elongated flexible segment and a protrusion projecting away from the segment. The second portion is configured for flexing toward the first portion to define an alternative gap having a second width that is smaller than the first width to thereby minimize the first perceivable gap between the vitreous element and the body panel. A vehicle includes a body panel, a vitreous element having an outer surface and spaced apart from the body panel to define the first perceivable gap, and the seal molding disposed between and in contact with the vitreous element and the body panel.

19 Claims, 3 Drawing Sheets

SEAL MOLDINGS FOR VEHICLES

TECHNICAL FIELD

The present invention generally relates to trim moldings for vehicles, and more specifically, to a seal molding of a vehicle.

BACKGROUND OF THE INVENTION

Vehicles may be exposed to water, particulates, and wind during operation. Therefore, a seal between a vitreous element of the vehicle, such as a windshield, and a body panel of the vehicle, such as a roof deck, is desirable to maintain a dry, clean, and quiet cabin for occupants. Similarly, such seals between other vitreous elements of the vehicle, such as headlight housings, and other body panels of the vehicle, such as fascias, are desirable to maintain a dry and clean housing for vehicle components. Seal moldings often provide both the desired seal and a perceivable transition between the vitreous element and the body panel.

SUMMARY OF THE INVENTION

A seal molding configured for minimizing a first perceivable gap having a first width between a vitreous element and a body panel of a vehicle includes a first portion configured for abutting the vitreous element and a second portion configured for abutting the body panel. The second portion includes an elongated flexible segment and a protrusion projecting away from the elongated flexible segment. The second portion is configured for flexing toward the first portion to define an alternative gap having a second width that is smaller than the first width to thereby minimize the first perceivable gap between the vitreous element and the body panel.

In another embodiment, a seal molding includes a first portion configured for abutting the vitreous element and including a sill projecting from the first portion. The seal molding also includes a second portion configured for abutting the body panel and including the elongated flexible segment. The second portion includes a protrusion projecting away from the elongated flexible segment and shaped to mate with the sill. The second portion is configured for flexing toward and abutting the sill to define the alternative gap having the second width that is smaller than the first width to thereby minimize the first perceivable gap between the vitreous element and the body panel.

A vehicle includes a body panel, a vitreous element having an outer surface and spaced apart from the body panel to define the first perceivable gap having the first width, and the seal molding. The seal molding is disposed between and in contact with the vitreous element and the body panel and is configured for minimizing the first perceivable gap. The seal molding includes the first portion configured for abutting the vitreous element, and the second portion configured for abutting the body panel. The second portion includes the elongated flexible segment and the protrusion projecting away from the elongated flexible segment. The second portion is flexed toward the first portion to define an alternative gap having the second width that is smaller than the first width to thereby minimize the first perceivable gap between the vitreous element and the body panel.

The vehicles and seal moldings thereof provide an excellent seal between the vitreous element and the body panel and therefore maintain dry, clean, and quiet cabins and/or electronics housings of the vehicles. The seal moldings also minimize the first perceivable gap between the vitreous element and the body panel and thereby enhance an appearance of the vehicles. Further, the seal moldings enable multiple vehicle designs and clearances between the vitreous element and the body panel. Additionally, the seal moldings provide a smooth transition between the vitreous element and the body panel, are compatible with non-staggered-edge vitreous elements, and are cost-effective to install in the vehicles.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
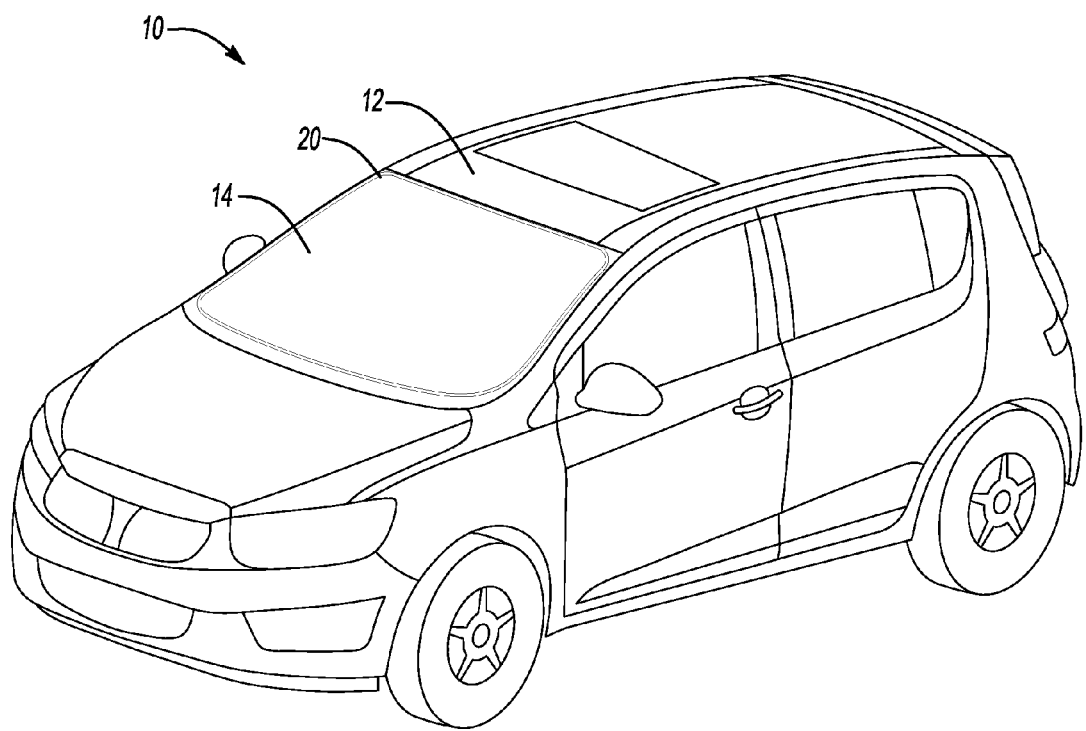
FIG. 1 is a perspective view of a vehicle including a seal molding disposed between and in contact with a body panel and a vitreous element.

Referring to the Figures, wherein like reference numerals refer to like components, a vehicle is shown generally at 10 in FIG. 1. The vehicle 10 may be useful for automotive applications, such as for sedans, convertibles, vans, trucks, sport-utility-vehicles, and the like. However, it is to be appreciated that the vehicle 10 may also be useful for non-automotive applications, such as, but not limited to, aviation, marine, rail, and recreational vehicle applications.

Referring to FIG. 1, the vehicle 10 includes a body panel 12 and a vitreous element 14. As used herein, the terminology "vitreous" refers to a material of the nature of or resembling glass, as in transparency, translucency, brittleness, hardness, and/or glossiness. Therefore, the vehicle 10 may be useful for applications requiring a transparent material. That is, the vehicle 10 may be suitable for applications requiring windshields; windows, e.g., quarter windows, backlight windows, and/or side windows; turn signals; headlights; taillights; sunroofs; moonroofs; and the like.

The vehicle 10 may include any suitable body panel 12 and vitreous element 14. For example, the vehicle 10 may include body panels 12 such as, but not limited to, roof panels, deck lids, trunk lids, side body panels, fascias, and the like, and vitreous elements 14 such as, but not limited to, windshields, windows, headlight housings, tail light housings, turn signal housings, and the like.

Figure 2:
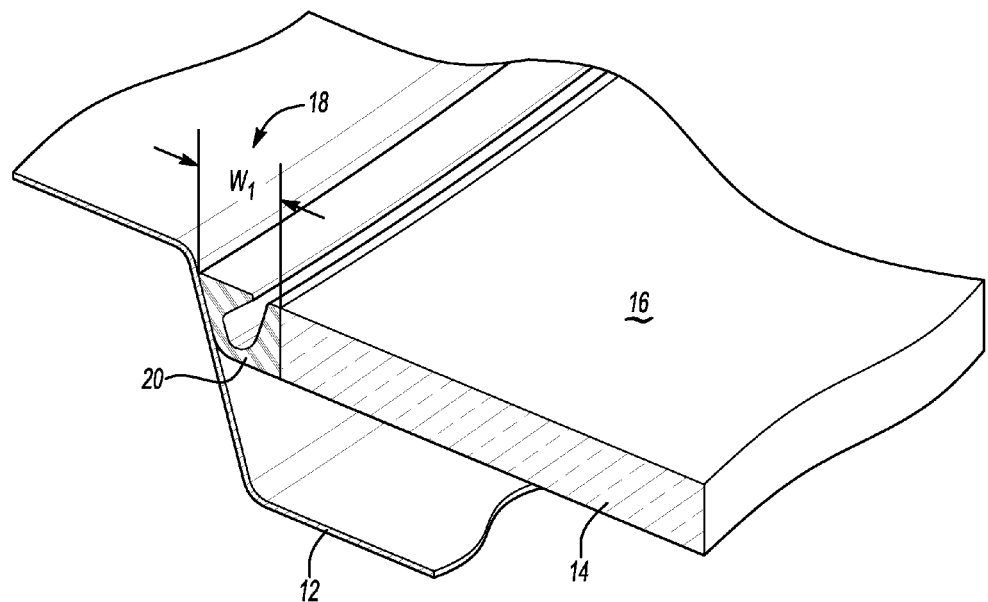
FIG. 2 is a fragmentary perspective and sectional view of an illustration of a first embodiment of a seal molding disposed between the body panel and the vitreous element of the vehicle of FIG. 1.

Referring to FIG. 2, the vitreous element 14 has an outer surface 16. As used herein, the terminology "outer" refers to surfaces on an exterior of the vehicle 10, i.e., surfaces facing away from an occupant of the vehicle 10. In contrast, the terminology "inner" refers to surfaces facing an interior of the vehicle 10. The outer surface 16 of the vitreous element 14 is therefore generally exposed to water, particulates, and wind, and is generally transparent. For applications including windshields or other automotive glass, the vitreous element 14 may include multiple laminated glass panes and/or reinforcing layers such as shown in FIG. 3.

As shown in FIG. 2, for the vehicle 10, the vitreous element 14 is spaced apart from the body panel 12 to define a first perceivable gap 18 having a first width $w_1$. That is, for a typical vehicle 10 (FIG. 1), the vitreous element 14 is spaced apart from the body panel 12 of the vehicle 10 according to, for example, design tolerances and/or manufacturing specifications to form the first perceivable gap 18. The first perceivable gap 18 may be visible from a position outside the vehicle 10 as a perceivable transition between the vitreous element 14 and the body panel 12.

Figure 3:
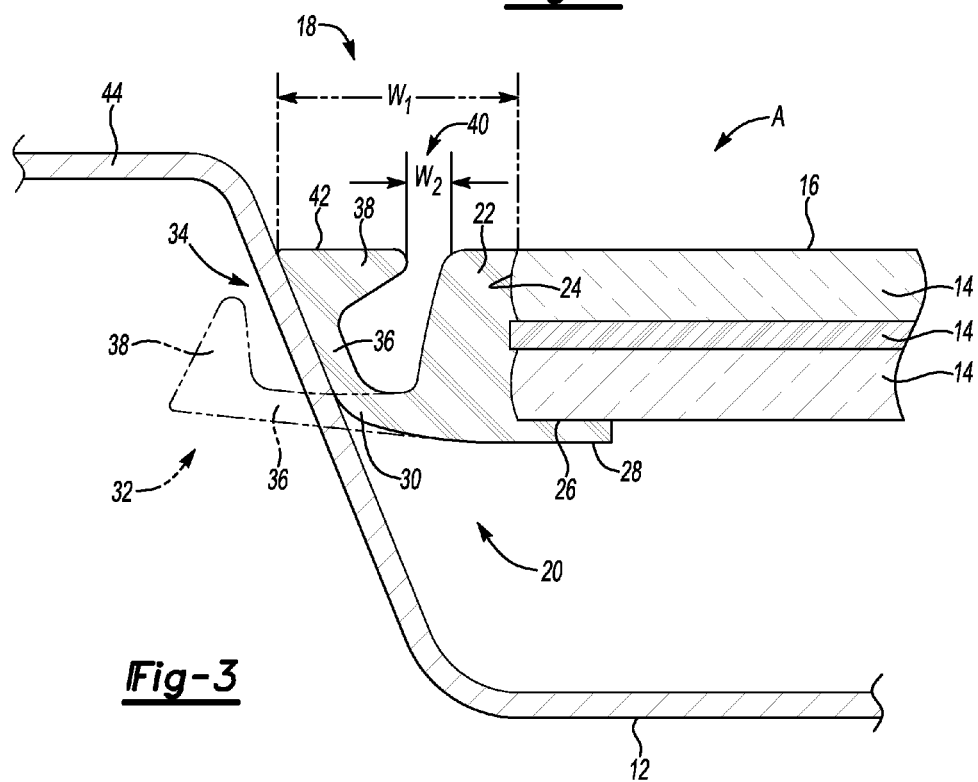
FIG. 3 is a side sectional view of an illustration of the seal molding of FIG. 2 disposed in a first extended position (in phantom) and a second flexed position.

Referring now to FIGS. 1 and 3, the vehicle 10 also includes a seal molding 20 disposed between and in contact with the vitreous element 14 and the body panel 12. The seal molding 20 is configured for reducing, and thus minimizing, the first perceivable gap 18 between the vitreous element 14 and the body panel 12 of the vehicle 10, as set forth in more detail below.

Referring to FIG. 3, the seal molding 20 includes a first portion 22 configured for abutting the vitreous element 14. For example, the configuration of the first portion 22 enables the abutment of the first portion 22 to at least two surfaces 24, 26 of the vitreous element. More specifically, the first portion 22 may be adhered to the vitreous element 14. For example, prior to installation of the vitreous element 14 in the vehicle 10 during vehicle manufacturing, the first portion 22 may be adhered to the vitreous element 14 with an adhesive and/or a sealant to thereby wrap around two surfaces 24, 26 of the vitreous element 14. That is, the first portion 22 may be pre-installed on the vitreous element 14 prior to installation of the vitreous element 14 in the vehicle 10.

Referring to FIG. 3, the first portion 22 may not contact the outer surface 16 of the vitreous element 14. That is, the first portion 22 may not overhang and/or abut the outer surface 16. Rather, the first portion 22 may be adhered, for example, to a body-panel-facing surface 24 and an inner surface 26 of the vitreous element 14. In this arrangement, therefore, the seal molding 20 may not obstruct a view through the vitreous element 14, and may enhance vehicle aesthetics. The first portion 22 may also accommodate any thickness of the vitreous element 14, e.g., vitreous elements 14 including multiple laminated glass panes and/or reinforcing layers.

As shown in FIG. 3, the first portion 22 may also include, for example, a finger 28 configured for adhering the first portion 22 of the seal molding 20 to the inner surface 26 of the vitreous element 14. One skilled in the art may select the shape of the finger 28 according to expected vehicle operating conditions including view obstruction through the vitreous element 14, and design specifications such as adhesive strength and thickness of the vitreous element 14.

Referring again to FIG. 3, the seal molding 20 also includes a second portion 30 configured for abutting the body panel 12. That is, the second portion 30 may contact the body panel 12 when the seal molding 20 is installed in the vehicle 10, as set forth in more detail below.

More specifically, the second portion 30 may be flexible with respect to the first portion 22 and formed as a single piece. That is, the first portion 22 and the second portion 30 may be integral. The seal molding 20 may be flexible between a first extended position 32 (shown in phantom in FIG. 3) and a second flexed position 34. As such, the seal molding 20 may be formed from any suitable flexible material. For example, the seal molding 20 may be formed from polyurethane.

Referring again to FIG. 3, the second portion 30 includes an elongated flexible segment 36 and a protrusion 38 projecting away from the elongated flexible segment 36 in the direction of flex. The elongated flexible segment 36 generally provides a flexible link between the first portion 22 and the protrusion 38 of the second portion 30. The elongated flexible segment 36 may have any suitable length and thickness as determined by vehicle styling and manufacturing tolerances. Although, generally, the thickness of the elongated flexible segment 36 is less than a thickness of each of the first portion 22 and the protrusion 38.

Referring to FIG. 3, the protrusion 38 projects away from the elongated flexible segment 36. The protrusion 38 may protrude generally perpendicularly from the elongated flexible segment 36. For example, the protrusion 38 may have a triangular shape and may be formed from the distal end of the second portion 30.

Referring to FIG. 3, the second portion 30 is configured for flexing toward the first portion 22 to define an alternative gap 40. The alternative gap 40 has a second width $w_2$ that is smaller than the first width $w_1$. Therefore, the second portion 30 is configured for flexing toward the first portion 22 to thereby minimize the first perceivable gap 18 between the vitreous element 14 and the body panel 12.

More specifically, the seal molding 20 may be disposed in the first extended position 32 prior to installation in the vehicle 10, and may bend to the second flexed position 34 upon installation in the vehicle 10. For example, the seal molding 20 may be attached to the vitreous element 14 via the first portion 22, as set forth above, and the second portion 30 may extend away from the body-panel-facing surface 24 of the vitreous element 14. Referring to FIG. 3, during installation of the seal molding 20 into the vehicle 10, the vitreous element 14 may approach the body panel 12 in the general direction of arrow A so that the second portion 30 first contacts the body panel 12. Finally, as the vitreous element 14 and attached seal molding 20 are aligned in place in the vehicle 10, the second portion 30 of the seal molding 20 flexes with respect to the first portion 22 as the second portion 30 abuts the body panel 12.

The second flexed position 34 occurs as the second portion 30 of the seal molding 20 is flexed with respect to the first portion 22 and the protrusion 38 projects toward the first portion 22 to shorten the distance, and thus the space, between the first portion 22 and the second portion 30, i.e., to minimize the first perceivable gap 18 between the vitreous element 14 and the body panel 12. For example, the alternative gap 40 between the vitreous element 14 and the body panel 12 may have a second width $w_2$ of less than or equal to about 1 mm. Although, it is to be appreciated that smaller or larger widths may also be contemplated according to desired vehicle appearance and styling. In one variation, for example, the second width $w_2$ of the alternative gap 40 may not be substantially perceivable. For example, the protrusion 38 may abuttingly mate with the first portion 22 so that first perceivable gap 18 may be substantially eliminated.

As shown in FIG. 3, an edge 42 of the protrusion 38 and the outer surface 16 of the vitreous element 14 may be disposed in the same plane. That is, the protrusion 38 may be disposed as a coextension of the plane of the outer surface 16 of the vitreous element 14 when in the second flexed position 34. Further, the first portion 22 and the protrusion 38 may each be disposed flush to each other so that the outer surface 16 of the vitreous element 14 and the edge 42 of the protrusion 38 may be aligned as one continuous plane when the protrusion 38 is in the second flexed position 34. That is, the seal molding 20 may be positioned in the vehicle 10 in the same plane as the outer surface 16 of the vitreous element 14 so as to form a planar transition between the body panel 12 and the vitreous element 14. It is also to be appreciated that the protrusion 38 and the first portion 22 of the seal molding 20 may be disposed flush with the outer surface 16 of the vitreous element 14, but sub-flush with respect to an outer edge 44 of the body panel 12. Further, although not shown in FIG. 3, if desired according to vehicle design aesthetics and styling, the seal molding 20 may also be disposed sub-flush with respect to the outer surface 16 of the vitreous element 14, e.g., in a plane parallel to the outer surface 16 of the vitreous element 14.

Figure 4:
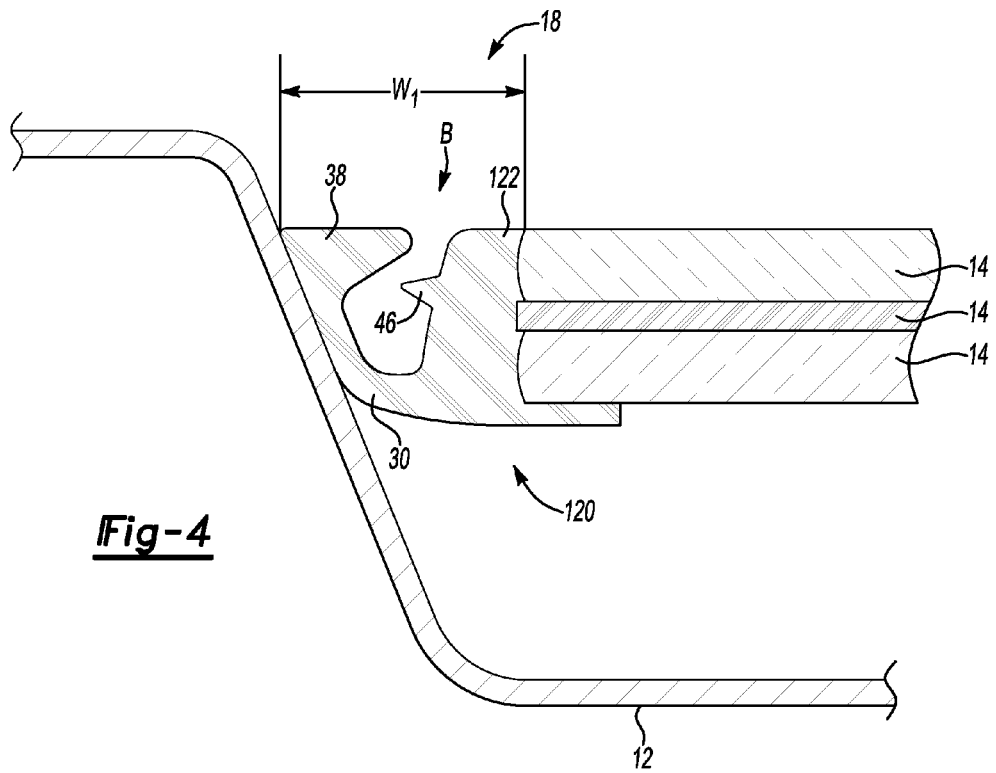
FIG. 4 is a side sectional view of an illustration of a second embodiment of the seal molding of FIGS. 2 and 3.

Referring to FIG. 4, in a second embodiment of the seal molding 120, the first portion 122 of the seal molding 120 may include a ledge 46 protruding from the first portion 122. The ledge 46 may be configured for concealing a portion of the first perceivable gap 18 between the vitreous element 14 and the body panel 12. The ledge 46 may have any suitable shape, length, width, and/or thickness, and may protrude from any location on the first portion 122. For this embodiment, the second portion 30 may be sufficiently juxtaposed with respect to the ledge 46 to thereby minimize the first perceivable gap 18. For example, the second portion 30 may overhang the ledge 46. That is, as the second portion 30 is flexed toward the first portion 122, the protrusion 38 may be sufficiently juxtaposed with respect to the ledge 46. Therefore, when viewed from the direction of arrow B in FIG. 4, the ledge 46 may further conceal or restrict a portion of the first perceivable gap 18, as set forth in more detail below. Since the ledge 46, the first portion 122, and the second portion 30 may be integral and formed from the same material, and therefore have the same color, the ledge 46 may protrude sufficiently into an opening between the first portion 122 and the second portion 30 to obscure the view into portions of the seal molding 120. The obscured view may therefore create the appearance of an uninterrupted transition between the first portion 22 and the second portion 30 so as to minimize the first perceivable gap 18 between the vitreous element 14 and the body panel 12.

Figure 5:
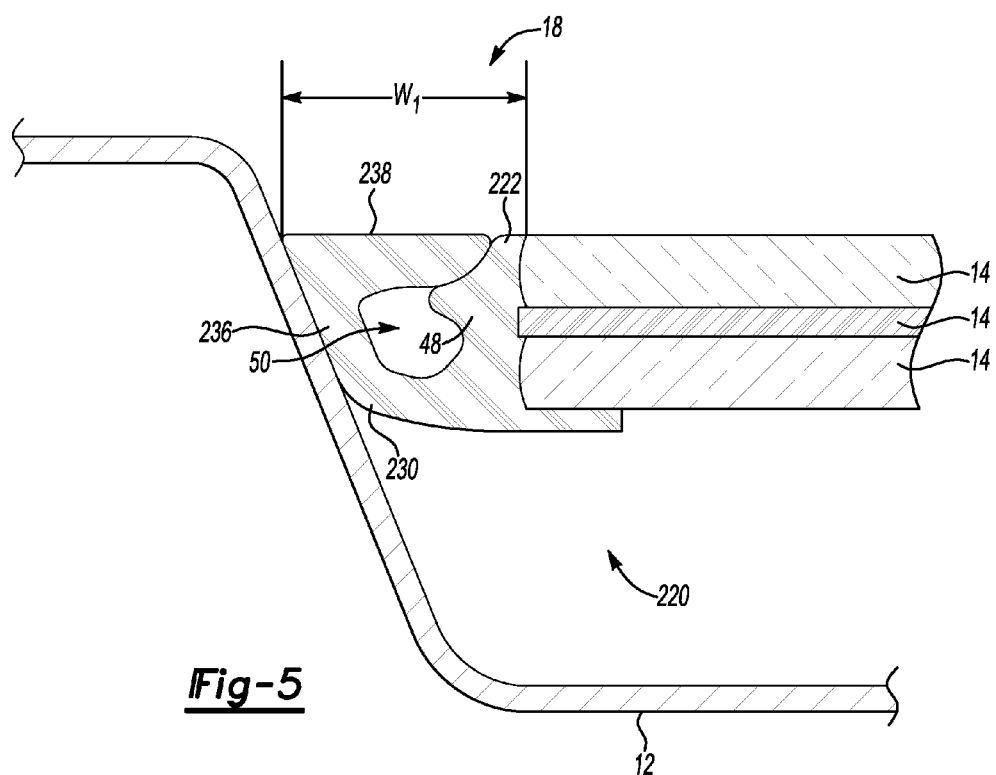
FIG. 5 is a side sectional view of an illustration of a third embodiment of the seal molding of FIGS. 2 and 3.

Referring now to FIG. 5, in a third embodiment of the seal molding 220, the seal molding 220 includes a first portion 222 configured for abutting the vitreous element 14, as set forth above. The first portion 222 also includes a sill 48 projecting from the first portion 222. In this embodiment, the second portion 230 is configured for abutting the body panel 12, as set forth above, and includes an elongated flexible segment 236 and a protrusion 238 projecting away from the elongated flexible segment 236 and shaped to mate with the sill 48. For example, the sill 48 may be complementarily-shaped with the protrusion 238 so as to mate with and support the protrusion 238 when the second portion 230 flexes and abuts the body panel 12. Stated differently, the sill 48 may be configured for supporting the protrusion 238.

The second portion 230 is configured for flexing toward and abutting the sill 48 to reduce and thereby minimize the first perceivable gap 18 between the vitreous element 14 and the body panel 12, as shown in FIG. 5. In particular, the protrusion 238 of the second portion 230 may abut and mate with the sill 48. Further, the protrusion 238 may abut the sill 48 to thereby define a hollow channel 50 longitudinally through the seal molding 220. In this embodiment, the second width $w_2$ may not be substantially perceivable. That is, the first perceivable gap 18 may be substantially eliminated to form a transition between the vitreous element 14 and the body panel 12 that is generally not perceivable. The hollow channel 50 allows for the minimized, e.g., substantially eliminated, first perceivable gap 18 without an accompanying increase in vehicle weight associated with a seal molding free from the hollow channel 50.

The vehicles 10 and seal moldings 20, 120, 220 provide an excellent seal between the vitreous element 14 and the body panel 12 and therefore maintain dry, clean, and quiet cabins and/or electronics housings for the vehicles 10. The seal moldings 20, 120, 220 also minimize the first perceivable gap 18 between the vitreous element 14 and the body panel 12 and thereby enhance an appearance of the vehicles 10. Further, the seal moldings 20, 120, 220 enable multiple vehicle designs and clearances between the vitreous element 14 and the body panel 12. Additionally, the seal moldings 20, 120, 220 provide a smooth transition between the vitreous element 14 and the body panel 12, are compatible with non-staggered-edge vitreous elements 14, and are cost-effective to install in the vehicles 10.

While the best modes for carrying out the invention have been described in detail, those familiar with the art to which this invention relates will recognize various alternative designs and embodiments for practicing the invention within the scope of the appended claims.

The invention claimed is:

1. A seal molding configured for minimizing a first perceivable gap having a first width between a vitreous element and a body panel of a vehicle, the seal molding comprising:
   a first portion configured for abutting the vitreous element; and
   a second portion configured for abutting the body panel and including an elongated flexible segment and a protrusion projecting away from said elongated flexible segment;
   wherein said second portion is configured for flexing toward said first portion to define an alternative gap having a second width that is smaller than the first width to thereby minimize the first perceivable gap between the vitreous element and the body panel.

2. The seal molding of claim 1, wherein the seal molding is flexible between a first extended position and a second flexed position.

3. The seal molding of claim 1, wherein said first portion and said second portion are integral.

4. The seal molding of claim 2, wherein said protrusion has a triangular shape.

5. The seal molding of claim 1, wherein the configuration of said first portion enables the abutment of said first portion to at least two surfaces of the vitreous element.

6. The seal molding of claim 1, wherein said first portion includes a ledge protruding from said first portion and configured for concealing a portion of said first perceivable gap between the vitreous element and the body panel.

7. A seal molding configured for minimizing a first perceivable gap having a first width between a vitreous element and a body panel of a vehicle, the seal molding comprising:
   a first portion configured for abutting the vitreous element and including a sill projecting from said first portion; and
   a second portion configured for abutting the body panel and including an elongated flexible segment and a protrusion projecting away from said elongated flexible segment and shaped to mate with said sill;
   wherein said second portion is configured for flexing toward and abutting said sill to define an alternative gap having a second width that is smaller than the first width to thereby minimize the first perceivable gap between the vitreous element and the body panel.

8. The seal molding of claim 7, wherein said sill is configured for supporting said protrusion.

9. A vehicle comprising:
   a body panel;
   a vitreous element having an outer surface and spaced apart from said body panel to define a first perceivable gap having a first width; and a seal molding disposed between and in contact with said vitreous element and said body panel and configured for minimizing said first perceivable gap, said seal molding including;
   a first portion configured for abutting said vitreous element; and
   a second portion configured for abutting said body panel and including an elongated flexible segment and a protrusion projecting away from said elongated flexible segment;
wherein said second portion is flexed toward said first portion to define an alternative gap having a second width that is smaller than said first width to thereby minimize said first perceivable gap between said vitreous element and said body panel.

10. The vehicle of claim 9, wherein said first portion does not contact said outer surface of said vitreous element.

11. The vehicle of claim 9, wherein an edge of said protrusion and said outer surface of said vitreous element are disposed in the same plane.

12. The vehicle of claim 9, wherein said first portion is adhered to said vitreous element.

13. The vehicle of claim 9, wherein said alternative gap has a second width of less than or equal to about 1 mm.

14. The vehicle of claim 9, wherein said second width is not substantially perceivable.

15. The vehicle of claim 9, wherein said first portion includes a ledge configured for concealing a portion of said first perceivable gap.

16. The vehicle of claim 15, wherein said second portion is sufficiently juxtaposed with respect to said ledge to thereby minimize said first perceivable gap.

17. The vehicle of claim 9, wherein said first portion includes a sill projecting from said first portion and abutting said protrusion.

18. The vehicle of claim 17, wherein said protrusion abuts said sill to thereby define a hollow channel longitudinally through said seal molding.

19. The vehicle of claim 17, wherein said second width is not substantially perceivable.

\* \* \* \* \*